March 11, 1941.  G. F. WALES  2,234,849

PUNCH

Filed June 8, 1940  2 Sheets-Sheet 1

INVENTOR.
George F. Wales
by Parker, Prochnow & Farmer
ATTORNEYS.

March 11, 1941.　　　G. F. WALES　　　2,234,849

PUNCH

Filed June 8, 1940　　　2 Sheets-Sheet 2

INVENTOR.
George F. Wales
By Parker, Rockwood & Farmer
ATTORNEYS.

Patented Mar. 11, 1941

2,234,849

UNITED STATES PATENT OFFICE 2,234,849

PUNCH

George F. Wales, Kenmore, N. Y.

Application June 8, 1940, Serial No. 339,524

32 Claims. (Cl. 164—124)

This invention relates to punches for making holes or perforations in metal members, such as sheets, plates, bars and the like.

Punches for this purpose as heretofore constructed have been unyielding diametrically or peripherally, the result being that when the punch is forced through the metal, seizure upon the punch was severe so that considerable force was required to strip the work from the punch. Experiments conducted showed the following:

A punch .87425 inch in diameter was forced through sheet metal .024 inch in thickness into a die .880 inch in diameter. The diameter of the punched out slug was found to measure .879 inch and the diameter of the hole .87225 inch. In other words, while the punch was .87425 inch in diameter, it punched a hole smaller by .002 inch in diameter or .00628 inch in circumference. Considerable wear on the punch in stripping was, consequently, caused due to the scraping or abrasive action as the work dragged over the perimeter of the punch.

Standard engineering data show that the high limit of a pin to be forced into a hole .875 inch in diameter to make a forced fit, should be .002 inch greater in diameter, and that a pin .001 inch larger is used for a driving fit.

The experiment above referred to, consequently, shows that the metal about the punched hole closed in around the punch to such an extent as to make it comparable to a forced fit. Owing to the fact that punched holes are not truly cylindrical, but in part tapering, only about one half of the thickness of the metal seized the punch, and consequently, the force required for separating the work from the punch was somewhat less than in a forced fit, although it still remained severe. It has been necessary, therefore, to employ a strong stripping device in order to free the metal from the punch and to construct the punch so that it could counteract against stripping forces.

An object of this invention is to provide a punch for perforating metal members, which is so constructed that upon penetrating the work, the portion of the punch engaging the work is of the required dimensions transversely thereof, but which, when withdrawn from the work, is of reduced dimensions to facilitate stripping of the work from the punch. A further object of this invention is to provide a punch having the portion thereof adjacent to the end which penetrates the metal formed of a plurality of parts which during the punching operation are so spaced relatively to each other as to form a hole of the desired size in the metal, and which, upon stripping of the metal from the punch, assume other positions to reduce the size of the part of the punch which extends into the metal. Another object of this invention is to provide a punch having the working end thereof provided with means for assuming the full dimensions during the punching or down stroke of the punch, and to assume slightly lesser dimensions on the return or up stroke thereof.

A further object is to provide a punch including two or more separate segments extending lengthwise of the punch, which segments normally spring into open or full size positions, so that when penetrating the work, a small gap exists at the cutting edge between each segment, and in which the segments yield during the stripping action to greatly reduce the force required for stripping the work from the punch. Another object is to provide a punch with a part movable lengthwise of the punch, and which during the punching stroke moves into a position in which the end of the punch penetrating the work is of the required size, and which during the stripping stroke, slides into a position in which the end of the punch penetrating the work is of smaller size. Still another object of this invention is to provide a punch formed of a plurality of longitudinally extending segments which normally occupy positions relatively to each other to produce a smaller perimeter at the part of the punch which penetrates the work, and which upon pressure of the punch against the work become separated from each other to provide the part of the punch entering the metal with a greater perimeter.

Another object of this invention is to provide a punch having a longitudinally split work penetrating portion and means for limiting the extent to which the work penetrating portion of the punch may expand radially outwardly while penetrating the work.

Other objects of this invention will appear from the following description and claims.

In the accompanying drawings, which illustrate by way of examples, some embodiments of my invention.

Punches embodying my invention are adapted to be used in connection with any standard punch press or similar machine not shown in the drawings, which includes among other elements a lower supporting bed usually mounted on the lower part of the stationary frame of the press, and a ram which is guided upon the upper part of the main frame and is movable toward and from the bed. The movement of the ram toward the bed forces the punch toward the die and through the work supported above the die.

In the accompanying drawings, see particularly Figs. 1, 7, 12, 17 and 20, A represents a shoe attached to the reciprocatory ram of a press or similar machine, and B represents a punch plate attached to the shoe A by any suitable means such as bolts b. Dowel pins c serve to correctly position the punch plate B relatively to the shoe A. The punch plate is usually provided with a hole through which the punch extends and with a recess D on the upper face thereof to receive the head of the punch to hold the punch from pulling out of the punch plate during the stripping action. X represents the work and E represents the die over which the work is supported during the punching operation.

Figure 4:
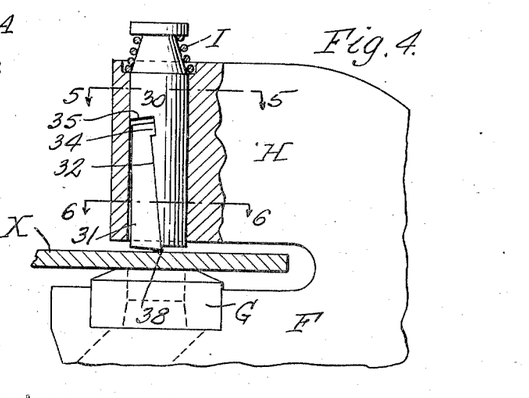
Fig. 4 is a sectional elevation showing a punch of a modified construction positioned in a supporting device of another form.

In Fig. 4, I have shown another form of perforating device adapted to be positioned between the bed and the ram of a press. This device is of the general type shown in my Patent No. 1,955,866 and includes a base F having a die G mounted thereon, and a head H which receives and guides the punch, a spring I returning the punch to its upper position and stripping the same from the work. All of the parts thus far described have heretofore been employed in connection with metal punching and of themselves constitute no part of this invention.

Punches made in accordance with my invention may be employed with any suitable or desired type of mechanism for forcing the same through the work. My improved punches are formed of two or more parts which engage the work and which are movable relatively to each other in such a manner that when the punch is moved in a direction to withdraw the same from the work, the relative movement of the parts of the punch will reduce or contract the transverse dimensions and perimeter of the part of the punch which penetrates the work in such a manner that the usual gripping or seizing of the punch by the work will be eliminated or greatly reduced. I have shown in the drawings, a number of embodiments of my invention, but it will be understood that my invention is not limited to these embodiments, since my invention may obviously be incorporated in many other forms. I have also shown my invention only as applied only to punches of circular cross section, but it will be understood that it is not intended to so limit this invention since the same may be applied to punches of any desired cross sectional shapes and of any size.

Figure 1:
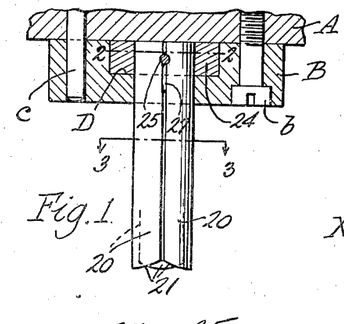
Fig. 1 is an elevation, partly in section of a punch embodying this invention, and showing the same supported on the main shoe of a press.
Figures 2, 3, 5:
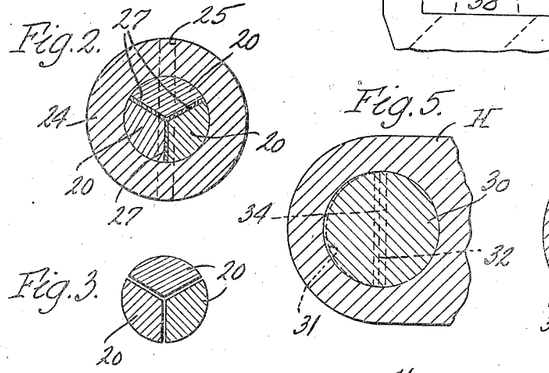
Figs. 2 and 3 are transverse sections thereof respectively, on lines 2—2 and 3—3, Fig. 1.
Figs. 5 and 6 are transverse sections thereof, taken respectively on lines 5—5 and 6—6, Fig. 4.

In the particular embodiment of my invention shown in Figs. 1 to 3, the punch is split or divided longitudinally into a plurality of parts, that shown being formed of three separate parts or blades 20, each of which extends throughout the length of the punch, the parts being securely held together at their upper ends. I have shown the three parts of the punch identical with each other, but obviously these parts may each be of different cross sectional shape. These parts of the punch are so assembled that the portions of these blades or parts which penetrate the work are spaced to a slight extent from each other. This spacing as shown in the drawings is greatly exaggerated and actually the space between these parts is only a few thousandths of an inch. The parts 20 of the punch, consequently, perforate the work while they are spaced apart and since, as heretofore explained, the hole made in the work by the punch is smaller than the punch, the portions of the blades or parts of the punch in the work are flexed or bent toward each other by the work, so that seizing of the punch by the work is avoided, thus permitting the punch to be easily withdrawn from the work.

Contrary to what might be logically expected, I have found that when a hole is formed by means of the punch shown in Figs. 1 to 3, the spaces or gaps between the blades or parts 20 of the punch do not leave any rough spots or irregularities on the inner surface of the punched hole. This is due to the fact that the gap or space between the punch parts is so small that the metal fibers of the work at the gaps break straight across the gaps and do not tend to sliver in the gaps. The lower ends of the parts of the punch may be bevelled or inclined, as shown at 21, so that the cutting action takes place progressively about the periphery of the lower end of each part of the punch.

Any suitable or desired means may be employed for securing the parts 20 of the punch in fixed relation to each other. In the particular construction shown, the upper ends of these parts of the punch may be forced into a ring or collar 24 and by holding these parts together by means of a transversely extending pin 25. In order to provide the spaces or gaps between the work engaging ends of the parts 20, the opposite ends thereof engaged by the ring 24 may be spaced apart by means of inserts or shims 27 which act to hold the parts of the punch uniformly spaced from each other throughout their length. The ring 24 also forms a head for the punch, by means of which it is withdrawn from the work, and since the punch described is not seized by the work, so that it can be very easily withdrawn from the work, the connection between the ring 24 and the punch parts is ample to withstand the necessary pull on the punch during the stripping operation.

The punch, in the construction illustrated, is made in three parts, but it will be obvious that, if desired, the punch may be made of two or more than three parts. The material from which the parts of the punch are made has ample resiliency to permit the portion of the punch which engages the metal to be easily flexed or bent inwardly to a slight extent during the stripping of the punch from the work. This bending or flexing of the parts of the punch is very slight, since it will be obvious from the experiment hereinbefore referred to, that in a ⅞ inch punch, a constricting of the diameter of the work engaging part of the punch to the extent of a .002 inch is sufficient to prevent seizing of the work on the punch, and a restriction in the circumference or perimeter of this portion of the punch of .00628 inch is sufficient to avoid seizure of the punch by the work. Consequently, when a ⅞ inch punch is made in three parts, as shown in Figs. 1 to 3, a .0021 inch clearance between the lower or work engaging ends of the parts is sufficient to prevent seizing, and a slightly greater gap or clearance may be provided to permit a very easy withdrawal of the punch from the work. Such small gaps or clearances are much too small to produce any noticeable effect on the work, and can be readily obtained, for example, by means of the shims or spacers 27. The oppositely arranged faces of the blades or parts 20 of the punch also serve as stops to limit the extent to which these parts may move toward each other. The movement of the parts 20 is so small as to have no tendency to cause crystallization and the resulting breaking of the metal of these parts.

Figure 6:
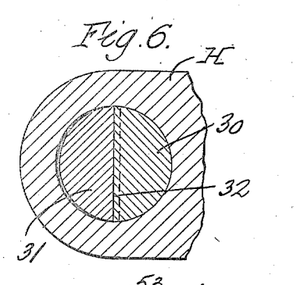

In Figs. 4 to 6, I have shown a punch of modified construction, in which the portion thereof engaging the work is formed of two relatively movable parts. Thus punch includes a main part 30 and a part 31 which is slidable in the main part, the two parts of the punch being split or divided from each other along a surface 32 which extends generally lengthwise of the direction of movement of the punch toward and from the work, but which extends at a slight angle to this direction of movement, so that the movable part 31 is of less thickness near its upper end than at its lower end. The part 31 normally extends slightly below the lower end of the part 30. It will be obvious from Fig. 4 that if the punch is moved toward the work X, the part 31 thereof will first engage the work and will be held thereby against farther downward movement, while the part 30 continues its downward movement. This relative movement of the two parts 30 and 31 along the slightly inclined surface 32 results in a component of movement of the part 31 in a direction crosswise of the length of the punch. Consequently, when the parts 30 and 31 have moved to the limit of this movement relatively to each other, the lower work engaging portion of the punch will have the desired dimensions and perimeter necessary to punch a hole of the desired size in the work X. On the other hand, when the punch is moved in the reverse direction, to withdraw the punch from the work, the parts 30 and 31 will again slide on the inclined surface 32 relatively to each other, so that the two parts of the punch will again occupy the positions shown in Fig. 4. This relative movement of the part 31 of the punch has a component of movement toward the other part 30 of the punch which results in a reduction of the perimeter of the portion of the punch which has penetrated the work. Consequently, the portion of the punch which engages the work is of smaller dimensions when being stripped from the work than during the punching stroke, thus greatly facilitating the stripping of the work from the punch and greatly reducing the amount of force required to perform the stripping operation. This is a very important feature in some cases, since a relatively small spring such as the spring 1 in Fig. 4 can be used for removing this punch from the work, whereas with solid punches, such as heretofore used, a very much heavier spring was necessary to strip the punch from the work.

Any suitable means may be employed to limit the movement of the parts of the punch relatively to each other. For example, the part 30 of the punch may be provided with a transversely extending recess into which a correspondingly shaped projection 34 of the part 31 may enter. This recess is of greater dimension vertically than the projection 34. The engagement of the projection 34 with the lower edge in the recess of the part 30 limits the downward movement of the part 31 relatively to the part 30. The movement in the other direction is resisted by the engagement of the comparatively flat upper end of the part 31 on a transverse shoulder 35 of the part 30 of the punch, which shoulder, as shown, may also form the upper wall of the recess. By limiting the upward movement of the part 31, this part cannot become bound or wedged in the guide recess or hole formed in the head H of the perforating apparatus shown in Fig. 4.

In order to hold the part 31 of the punch in correct relation to the other part 30 during the punching stroke, the lower end of the part 31 may be bevelled or inclined, so that the edge 38 will first engage the metal. This inclined surface will, during movement of the punch toward the work, tend to urge the part 31 toward the inclined surface 32, so that the holes made by the punch will all be of correct shape and size. Other means for holding the part 31 in correct relation to the part 30 may, however, be used.

Figures 7, 8, 9, 10, 11:
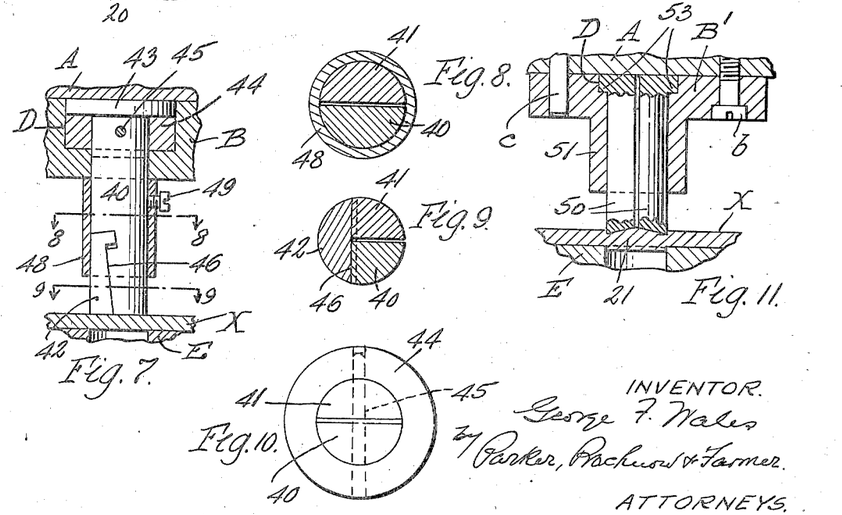
Fig. 7 is a sectional elevation of a punch of still another modified form showing the same in operative relation to a holder, the work and a die.
Figs. 8 and 9 are transverse sections thereof, taken respectively on lines 8—8 and 9—9, Fig. 7.
Fig. 10 is a top plan view of the punch shown in Fig. 7.
Fig. 11 is a sectional elevation showing a punch of slightly modified form from that shown in Figs. 1 to 3.

While the construction shown in Figs. 4 to 6 very greatly reduces the force required for stripping, yet it will be noted that the diameter of the punch extending parallel to the contacting surface 32 remains unchanged during the movement of the part 31 of the punch. Consequently, there will still be a slight binding action of the work on the punch at opposite sides of the split 32 of the punch. In Figs. 7 to 9, I have illustrated a construction by means of which even this slight binding action may be eliminated, by a combination of the idea contained in Figs. 1 to 3 with that shown in Figs. 4 to 6. In Figs. 7 to 10, the punch is split or divided lengthwise into three parts, two of the parts 40 and 41 extending substantially throughout the length of the punch and the third part 42 being similar to the part 31 described in Figs. 4 to 6. The upper ends of the parts 40 and 41, in the construction shown, are substantially semi-circular in cross section, and the upper ends of the parts 40 and 41 may be secured together at their upper ends in a similar manner to that described in connection with Figs. 1 to 3, for example, by means of a ring 44, to which the parts 41 and 42 may be secured by means of a pin 45. 43 represents a backing plate of any suitable hard material which may be employed for the purpose of preventing the parts of the punch from sinking into the softer metal of the shoe A. A shim or spacing member similar to those described in connection with Figs. 1 to 3 may be arranged between the upper end of the parts 40 and 41 of the punch so that the lower or work engaging portions of these two parts of the punch will be spaced apart to the desired extent, to permit these parts to move toward each other to overcome the binding action of the work on the punch. At their lower portions, the two parts 40 and 41 are cut away to receive the part 42 and a slightly inclined surface 46 is formed thereon similar to the surface 32 shown in Figs. 4 to 6, which cooperates with a corresponding surface on the part 42 of the punch, so that when the punch is pressed into engagement with the work, this part 42 will be moved upwardly relatively to the parts 40 and 41 along the surface 46 and this relative movement will have a transverse component of movement which results in positioning the part 42 so that the punch assumes its full size and perimeter. After the punch has been forced through the work, the gripping action causes the parts 40 and 41 to move toward each other and the upward pull on the punch to remove the same from the work will cause the part 42 to move downwardly relatively to parts 40 and 41, and thus further reduce the perimeter of the work engaging portion of the punch so that the same can be easily withdrawn from the work. It will be thus seen that the restriction of the work engaging portion of the punch by the relative movement of the part 42 relatively to the parts 40 and 41 and the movement of these parts 41 and 42 toward each other reduce the transverse dimensions of the work engaging part of the punch so that it will be relieved of any seizing of the work.

The punch may be provided with an outer sleeve 48 which serves to hold the part 42 in operative relation to the parts 40 and 41 and also serves to limit the movement of the lower ends of the parts of the punch from each other. This sleeve may be held in place in any suitable manner, for example, by means of a set screw 49. Any other means for holding the parts of the punch in correct relation to each other may be provided, and if the punch is used in connection with the perforating device shown in Fig. 4, the sleeve 48 may, of course, be omitted.

In Fig. 11 is shown a punch of the type illustrated in Figs. 1 to 3, in which the several blades or parts 50 of the punch are confined against excessive outward movement by means of a hollow boss or sleeve 51 formed on a punch plate B'. When confining sleeves, such as the sleeves 51 or 48, Fig. 7, are used, the shims 52 between the upper ends of the parts of the punch may be made of slightly greater thickness, for example, .004 inch for a ⅞ inch punch, and the inner bores of the sleeves are made such as to press the parts of the punch slightly toward each other to produce a hole of the correct size. This arrangement will ensure the correct relationship of the parts to each other, will prevent any outward spreading of the parts which would form an oversize hole, and the fact that the parts of the punch are flexed inwardly toward each other to a slight extent by the sleeve will also prevent any movement of the lower ends of the punch parts toward each other upon contacting with the work, which would produce an undersize hole.

In the construction shown in Fig. 11, the upper ends of the parts 50 of the punch are provided with slight outwardly extending flanges or heads 53 which are seated in the recess D of the punch plate B', to hold the parts of the punch on the punch plate when the same is secured in its operative position on the shoe A.

In the operation of the punches thus far described, the punch, while the parts thereof are in expanded positions, penetrates the work for a distance varying from 10% to 50% of the thickness of the metal. Since the hole in the die is always larger than the punch by an amount equal to about 10% of the thickness of the metal which is being punched, the unpenetrated part of the metal, upon further movement of the punch toward the die, breaks out in such a manner that the lower part of the hole and of the slug are approximately of the size of the hole in the die. The portion of the metal penetrated by the punch does not contract to grip the punch until the slug breaks out, since up to that time the slug is an integral part of the work, and consequently, prevents such contraction of the metal. After the breaking out of the slug, the contraction of the metal around the punch ordinarily causes the seizing of solid punches by the metal, but with my improved punches, the movement of the punch parts into contracted positions overcomes the difficulty of seizing.

In Figs. 12 to 21 inclusive, I have shown other modified forms of punches in each of which the punch is formed of a plurality of parts or blades, the lower or work engaging ends of which are movable toward and from the axis of a punch, this movement being produced by means of an expanding device which positively moves these ends of the blades outwardly during the punching stroke of the punch and permits them to move inwardly during the stripping stroke, the expanding element which produces this movement being located in the axial or middle portion of the punch. Obviously either the blades or the expanding device may move lengthwise of the punch to produce the outward movement of the blades and in the construction shown in Figs. 12 to 14, three blades or parts 60 are shown, the upper ends of which have slight outwardly extending shoulders 61 and these shoulders are arranged in an enlargement of the hole in the punch plate B. The lower end of the hole in the punch plate B through which the punch extends is of slightly smaller diameter, thus forming shoulders 62 with which the shoulders 61 of the parts or blades of the punch may engage. These two cooperating shoulders are spaced apart when the blades or parts 60 are in their upper position, thus providing for a limited up and down movement of the blades or parts 60 in the hole of the punch plate. The axial portion of the punch formed of these blades is bored out lengthwise, the bore being tapered at 63 so that this tapered part of the hole or bore converges downwardly. The movement of the lower ends of the parts or blades is produced by means of an expanding element 65 which is located within the bore of the punch parts and held against movement with these parts. This expanding device is provided with a tapering or frusto-conical face 66 which is formed to cooperate with the tapering part 63 of the bore. This expander may be held against movement relatively to the punch plate B in any suitable manner, and in the construction illustrated, the expander is provided with a head or flange 67 at the upper portion thereof, which is of slightly larger diameter than the shoulders 61 of the punch parts and is seated in a slightly larger portion of the hole in the punch plate through which the punch extends. Consequently, the punch plate B and shoe A secure the head 67 of the expander in fixed position thereto, so that the expander 65 is held against movement relatively to these parts while the parts 60 have a limited movement relatively to the expander.

Figure 12:
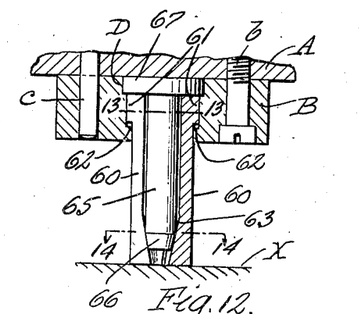
Fig. 12 is a sectional elevation of a punch of still another modified form.
Figure 13:
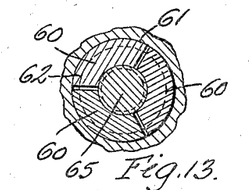
Figs. 13 and 14 are transverse sections thereof, on lines 13—13 and 14—14 respectively, Fig. 12.
Figure 14:
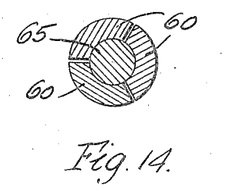

In the operation of this punch, the parts 60 of the punch, during the movement of the punch toward the work, upon engaging the work will be held stationary until the upper ends of these punch parts engage the head or flange 67 of the expander, and during this time interval, the expander moves downwardly. This relative movement of the parts 60 and the expander 65 will produce a slight outward movement of the punch parts because of the wedging action of the tapered part 66 of the expander on the tapering part 63 of the bore. The punch will, consequently, penetrate the work while expanded, and while the work engaging portion thereof is of the perimeter necessary to form a hole of the desired size. Upon reverse movement of the punch out of the work, the friction or gripping of the work against the punch parts 60 will hold these parts against upward movement with the expander until the shoulders 62 of the punch parts engage the shoulder formed in the hole of the punch plate B and this relative movement of the parts will produce a component of movement of the lower ends of these parts toward the axis of the punch, thus contracting or reducing the perimeter of the lower end of the punch, so that the same can be easily moved out of the punched hole in the work. In this construction, if desired, the parts 60 may be so formed that the lower or work penetrating portions thereof are normally in contact and are forced into their expanded positions by the expander against the resilience of these parts. Consequently, after initial upward movement of the expander, the lower portions of the blades or parts 60 will by their own resilience move out of engagement with the work, so that the punch will be entirely freed from the work.

Figure 15:
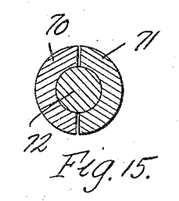
Figs. 15 and 16 are transverse sections of punches of further modified constructions.
Figure 16:
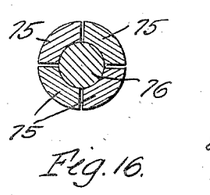

While I have shown the punch formed in three parts, it will be obvious that the same may be formed of any desired number of parts. In Fig. 15, I have shown a section through the lower part of a punch formed of two blades or parts 70 and 71 which cooperate with an expander 72. A construction of this kind may be desirable under some circumstances, for example, in connection with punches of small diameter. In Fig. 16, I have shown a similar section of a punch made in four parts 75 cooperating with an expander 76. It is, of course, obvious that if desired, more than four parts may be employed.

Figure 17:
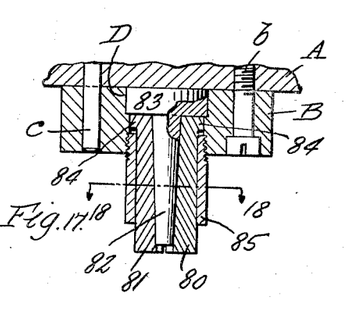
Fig. 17 is a sectional elevation of a punch of still another modified form.
Figure 18:
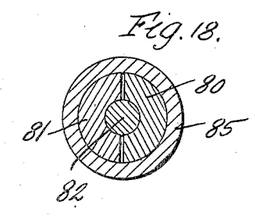
Fig. 18 is a transverse section thereof on line 18—18, Fig. 17.

The punch shown in Figs. 17 and 18 operates on the same principle as the one described in connection with Figs. 12 to 16, but is of somewhat modified construction. In Figs. 17 and 18, the punch is split lengthwise into two parts 80 and 81 and has a tapered internal bore which converges downwardly and is adapted to cooperate with a tapering expander 82 arranged within the punch, the expander having a head or shoulder 83 seated in an enlarged portion of the hole in the punch plate B. The punch parts 80 and 81 also have outwardly extending flanges 84 of slightly smaller diameter than the head 83 of the expander. In this case, the punch parts also move vertically relatively to the punch plate B and to the expander 82 and the limit of downward movement is determined by means of a sleeve 85 arranged about a portion of the punch and secured to the punch plate B in any suitable manner, for example, by means of screw threads on the upper part of the sleeve 85 which engage corresponding screw threads in the hole in the punch plate B. The upper end of the sleeve 85 cooperates with the shoulders 84 of the punch parts or blades 80 and 81 to limit the downward movement of these parts in the hole in the punch plate B and the lower part of the sleeve 85 serves the further purpose of limiting the outward movement of the work engaging portions of the blades 80 and 81. Furthermore, by means of this construction, the parts 80 of the punch can be readily removed from the punch plate B without removing the punch plate from the shoe A by merely unscrewing the sleeve 85.

The operation of this punch is similar to that described in connection with Figs. 12 to 16, the parts being shown in their expanded positions in Fig. 17, which positions they would occupy during the punching of the work. Upon movement of the punch out of the work, the punch parts or blades 80 and 81 will move downwardly relatively to the expander, thus contracting the perimeter of the work engaging end of the punch to facilitate the removal thereof from the work.

Figure 19:
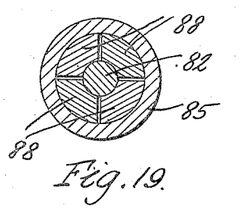
Fig. 19 is a transverse section of a punch of slightly different construction than the one shown in Figs. 17 and 18.

The punch shown in Figs. 17 and 18 may, of course, be made in as many parts or blades as may be desired, and in Fig. 19, I have shown a similar punch in which four blades or parts 88 are provided which cooperate with the expander 82 and the sleeve 85 in the same manner as described in connection with Figs. 17 and 18.

Figures 20, 21:
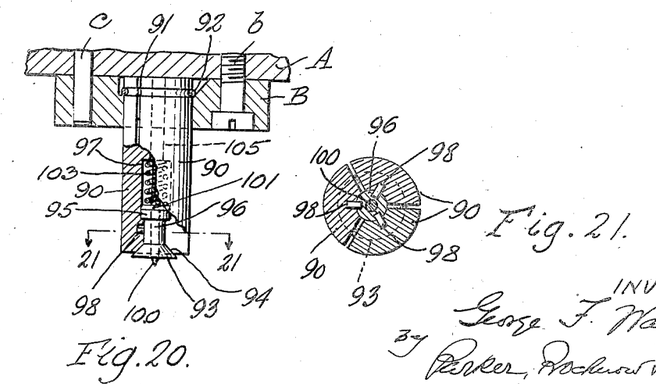
Fig. 20 is a sectional elevation of a punch of another modified construction.
Fig. 21 is a transverse section thereof, on line 21—21, Fig. 20.

In Figs. 20 and 21, there is shown a punch in which the parts or blades of the punch are held against endwise movement relatively to the punch plate and in which the expander is movable lengthwise of the punch. In this construction, there is shown, by way of example, a punch comprising three parts or blades 90, the upper portions of which may be spaced from each other by means of shims or spacers 91 and held in operative relation to each other by means of a spring or snap ring 92 seated in an annular groove in the punch and arranged in a shouldered recess extending downwardly from the upper face of the punch plate. 93 represents the expander which has a conical or wedge face 94 engaging with corresponding faces of the lower portions of the punch parts. The expander shown extends slightly below the lower end of the punch, and consequently, upon movement of the punch toward the work, engages the work before the lower ends of the blades of the punch. Thus the expander is forced upwardly by contact with the work and moves the lower ends of the parts of the punch radially outwardly into their expanded positions. This movement is, of course, very slight and in Fig. 20, the extent to which the expander extends below the punch is greatly exaggerated. The angle of the conical or wedge face 94 with the axis of the punch, and the angle of the corresponding faces on the parts of the punch is such that as soon as the punch has passed through the work and no upward pressure acts on the expander, the yielding force of the punch parts acting toward the axis of the punch will force the expander 93 to move downwardly, thus permitting the punch parts to move toward the axis into their restricted or inner positions, so that there is no binding or seizing of the work on the punch parts.

The expander may be held in place on the punch in any suitable or desired manner. For example, in the construction shown, the upper end of the expander is provided with a slightly enlarged head or flange 95 which is of slightly greater diameter on the middle cylindrical portion 96 of the expander, and the punch is provided with a central bore or aperture having an enlarged portion 97 which forms a shoulder with which the flange or head 95 engages when the expander is in its lowest or outer position. If desired, the expander may also be provided with one or more radially outwardly extending pins 98, each of which extends into a corresponding upright slot or recess formed in the inner faces of the punch blades or parts, the recesses being of sufficient length to permit the pins to move therein to the extent necessary to provide for the necessary movement of the expander relatively to the blades. These pins also serve to keep the blades properly spaced from each other. Any other means for limiting the movement of the expander may be provided, if desired, and also other means may be provided for keeping the lower ends of the blades in correct relation to each other.

It is frequently desirable to provide a punch with a center pilot or projection if the punch is to be used in connection with work on which the centers of the holes to be punched are marked by small depressions formed, for example, by a prick punch. 100 represents a center pilot which is slidably arranged in the axial portion of the expander 93, the expander being provided with an axial hole or bore through which the center pilot extends. Means are also provided for normally holding the center pilot in a position in which the lower pointed end thereof extends below the expander in a position to be inserted into a prick punch hole in the work. In the construction shown for this purpose, the upper end of the center pilot is provided with an outwardly extending flange or head 101 which is movable vertically in the enlarged hole or bore 97 in the punch, and a coil spring 103 may be provided in this enlargement of the bore. This spring bears against the head 101 of the center pilot, and thus yieldingly urges this center pilot into its lower position, as shown in Fig. 20. It is, of course, obvious that a center pilot of this kind may be employed in connection with other punch constructions herein shown.

In punches having expanders which necessitate the relative movement of the punch parts and the expander, it may be desirable to provide means for lubricating the relatively movable surfaces of the punch. Any suitable means may be employed for this purpose, and in the construction shown in Fig. 20, a wick 105 is provided in the central hole or bore of the punch from which lubricant will find its way to the contacting surfaces of the punch blades and expander, and this lubricant will also lubricate the outer surface of the center pilot and the inner bore of the expander.

In all of the constructions shown by way of example to illustrate my invention, the punches are formed of a plurality of parts which are split or divided from each other along surfaces extending substantially lengthwise of the punch and these parts are so constructed that there may be relative movement between the lower ends of the parts such as to produce a component of said movement which extends transversely of the direction of movement of the punch toward and from the work. This component of movement serves to contract the dimensions or perimeter of the lower or work engaging part of the punch during the stripping stroke so that the punch may easily be removed from the work. In the case of the vertically movable punch parts 31 and 42 shown in Figs. 4 to 10, the vertical movement of these punch parts has a component of transverse movement caused by the inclined cooperating surfaces of these punch parts with other parts of the punches. In the case of punches having parts which are split or divided throughout the length of the punch, as shown in Figs. 1 to 3, and 11 to 19 inclusive, and in case of the punch parts 40 and 41 shown in Figs. 7 to 10, the lower or work engaging portions of these blades or parts, because of their resilience, have a swinging movement toward and from each other, which movement also has a lateral component of motion, which results in the expansion and contraction of the perimeter of the work engaging part of the punch. In referring to the perimeter of these split punches, the work perimeter is intended to include the gaps between the punch parts.

Punches made in accordance with my invention have many advantages over solid punches as heretofore made. With solid punches, the failure or breakage of the punches resulted more frequently during the stripping operation than during the punching operation. Breakage of punches from this cause is entirely eliminated by means of punches of the general type herein described. With solid punches, the seizing of the punch by the work resulted in severe wear on the part of the punch entering the work, so that the punches would gradually become reduced in diameter so that if holes or accurate dimensions were required, the punches would frequently have to be discarded and replaced by new punches. Punches made in accordance with this invention retain their original dimensions for much greater periods of time so that the life of my punches is further lengthened for this reason.

The stripping operation with solid punches as heretofore made required strippers of very considerable strength. When springs were used for effecting the stripping, these springs had to be of ample size and strength so that it was frequently a problem to accommodate the springs or other stripping means within the space between the punch plate and the lower supporting bed of a press. In connection with perforating devices of the kind shown in Fig. 4, it was necessary with solid punches to use large springs which had to extend about the punch in the vertical guide aperture formed in the head H of the device, in order to make it possible to employ these devices between the ram and bed of the press and these heavy springs also limited the diameters of the punches which could be used with these perforating devices. By means of my improved expanding and contracting punches, it is possible to employ substantially the entire guide aperture in the punch head H for guiding the punch, since a relatively small spring I arranged largely above the head H is sufficient to withdraw the split punch from the work.

I claim as my invention:

1. An improved metal punch which may be used in a device of the type in which the work to be punched is supported against a die and the punch forced through the work while moving toward said die, said improved punch having a portion thereof, adjacent to the end which engages the work, split for a substantial distance from said end generally in the direction of the movement of the punch toward and from the work, the parts of the punch adjoining the split being movable relatively to one another during the operation of the punch in a direction having a component of movement extending crosswise of the direction of movement of the punch toward and from the work, whereby during retraction of the punch after a punching movement, the parts of said punch at said split will by a small amount of said relative movement toward each other, reduce at least one overall transverse dimension of said portion of the punch and facilitate the stripping of said punch from the work.

2. A punch for perforating metal, said punch having the work engaging portion thereof formed of a plurality of parts divided from each other along surfaces extending substantially lengthwise of the punch, at least one of said parts being movable relatively to another part after contraction of the perforated metal about the punch, said movement having a component of movement crosswise of the direction of movement of the punch toward and from the work, said component of movement, when the punch is withdrawn from the work, being toward said other part of the punch to reduce a transverse dimension of said portion of the punch to facilitate stripping of the punch from the work.

3. A punch for perforating metal, said punch having the work engaging portion thereof formed of a plurality of parts divided from each other along surfaces extending substantially lengthwise of the punch, at least one of said parts being movable relatively to another part upon contraction of the perforated metal about the punch, said movement having a component of movement crosswise of the direction of movement of the punch toward and from the work, said component of movement, when the punch is withdrawn from the work, being toward said other part of the punch to reduce a transverse dimension of said portion of the punch to facilitate stripping of the punch from the work, and means for limiting the relative movement of said parts of the punch.

4. A punch for perforating metal, said punch having the work engaging portion thereof formed of a plurality of parts movable relatively to each other, said parts when the punch enters the work occupying positions in which said portion of the punch has the perimeter required to produce a hole of the required dimensions and said parts, when the punch is withdrawn from the work, moving into positions in which the perimeter of said portion of the punch is reduced, to permit the punch to be easily withdrawn from the work.

5. A punch for perforating metal, said punch having the work engaging portion thereof formed of a plurality of parts movable relatively to each other, said parts when the punch enters the work occupying positions in which said portion of the punch has a greater perimeter than when said punch is withdrawn from the work, and means for limiting the relative movement of said parts of the punch.

6. A punch having the work engaging portion thereof split through a substantial distance from the work engaging end thereof, said split portion being normally of a perimeter to form in the work a hole of the desired dimensions and being contractible by the work after punching the same to facilitate withdrawing the punch from the work.

7. A punch formed of a plurality of longitudinally extending parts having the work engaging ends thereof spaced apart slightly while penetrating the work and mounted to swing toward each other when withdrawn from the work, to reduce the force required to strip the work from the punch.

8. A punch formed of a plurality of longitudinally extending parts having the work engaging ends thereof spaced apart slightly and their other ends secured together, said work engaging ends, after penetrating the work, being movable toward each other to contract the perimeter of the work engaging end of the punch to facilitate withdrawal of the same from the work.

9. A punch formed of a plurality of longitudinally extending parts, means for securing the upper ends of said parts together in slightly spaced relation to each other, to provide spaces between said parts at the lower work engaging portions thereof, said portions being yieldingly movable toward each other when pressure is exerted thereon by the work, to contract said work engaging end of the punch to facilitate stripping the work from the punch.

10. A punch formed of a plurality of parts divided from each other along a surface extending substantially lengthwise of the direction of movement of the punch toward and from the work, means for securing the upper ends of said parts in fixed relation to each other, said means also supporting the work engaging portions of said parts yieldingly in spaced relation to each other, whereby said portions may be flexed toward each other by the work after perforation of the same, to facilitate stripping of the punch from the work.

11. A punch having the work engaging portion thereof provided with a plurality of parts at least one of which is movable to a limited extent relatively to another part in a direction at an angle to the length of said punch such that during the punching stroke, said movable part has a component of movement transversely of the direction of movement of the punch to increase the perimeter of said portion of the punch, said component of movement during the stripping movement of the punch decreasing the perimeter of said portion of the punch.

12. A punch having the lower work engaging portion thereof provided with a plurality of parts, at least one of which is movable to a limited extent relatively to another part, said parts being split from each other along a surface extending at an angle to the direction of movement of the punch toward and from the work, said first part being of less width at the upper portion thereof than at the bottom, when measured transversely of said surface, and normally extending below said other part, whereby said first part, upon engaging the work, will be moved into a position to expand the perimeter of the work engaging part of the punch to that desired, and upon withdrawing the punch from the work, said first part will move into a position to reduce said perimeter.

13. A punch having the lower work engaging portion thereof provided with a plurality of parts, at least one of which is movable to a limited extent relatively to another part, said parts being split from each other along a surface extending at an angle to the direction of movement of the punch toward and from the work, said first part being of less width at the upper portion thereof than at the bottom, when measured transversely of said surface, and normally extending below said other part, and cooperating faces on said parts of the punch for limiting the relative movement of said parts, one of said faces also serving to transmit pressure to said first part during the punching stroke.

14. A punch having the lower work engaging portion thereof provided with a plurality of parts, at least one of which is movable to a limited extent relatively to another part, said parts being split from each other along a surface extending at an angle to the direction of movement of the punch toward and from the work said first part being of less width at the upper portion thereof than at the bottom, when measured transversely of said surface, and normally extending below said other part, whereby said first part, upon engaging the work will be moved into a position to expand the perimeter of the work engaging part of the punch to that desired, and upon withdrawing the punch from the work, said first part will move into a position to reduce said perimeter, and means for holding said parts in their operative slidable relations to each other.

15. A punch having the work engaging portion thereof formed of a plurality of parts adapted to contact along a surface extending at an acute angle to the length of the punch, one of said parts having a transverse slot at said surface and the other part having a projection extending into said slot and fitting loosely therein to permit said other part to move lengthwise of said first part to a limited extent, said movement being along said surface to impart to said other part a component of movement transversely of said punch to decrease the perimeter of said work engaging portion of said punch when the same is withdrawn from the work, and contacting faces on said parts of the punch to transmit pressure from said first part to said other part during the punching stroke.

16. A punch having the work engaging portion thereof split through a substantial distance from the work engaging end thereof, said split portion being normally of a perimeter to form in the work a hole of the desired dimensions and being contractible by the work after punching the same to facilitate withdrawing the punch from the work, said work engaging portion of said punch also including a tapering part slidable lengthwise thereof into punching position in which the perimeter of the punch is such as to form a hole of the desired size, and into a stripping position in which the perimeter of the punch is decreased.

17. A punch split lengthwise into a plurality of parts, an expander arranged in operative relation to said parts, and means actuated by the movement of said punch toward the work to produce relative movement of said parts and said expander, to move said parts into positions to expand the perimeter of the work engaging portion of said punch during the punching stroke.

18. A punch comprising an expander having a tapering face, a plurality of blades arranged about said expander and having parts cooperating with said tapering face, means for providing relative movement of said blades and expander upon engagement of the punch with the work, to move said parts into positions to expand the perimeter of the work engaging portion of said punch during the punching stroke.

19. A punch comprising an expander having a tapering face, a plurality of blades arranged about said expander and having parts cooperating with said tapering face, means for movably supporting said blades in relation to said expander, whereby said blades when pressed into engagement with the work and moved lengthwise of said punch are also moved outwardly by said tapering face.

20. A punch formed of a plurality of work engaging parts which are movable toward and from each other to a slight extent, an expander for producing outward movement of said parts and including a wedge shaped portion, means for supporting said parts for a limited movement lengthwise of said punch and said wedge portion, whereby the work engaging portions of said parts are moved outwardly during the punching stroke of said punch and inwardly during the stripping stroke, to facilitate removal of the punch from the work.

21. A punch split lengthwise into a plurality of parts, means for securing the upper ends of said parts in substantially fixed relation to each other, and an expander arranged at the work engaging ends of said parts and having a tapering face engaging said parts to move the same into positions to expand the perimeter of the work engaging end of said punch, said expander having a portion which engages the work in advance of said parts to move said parts into expanded positions before they engage the work.

22. A punch split lengthwise into a plurality of parts, an expander arranged in operative relation to said parts, means actuated by the movement of said punch toward the work to produce relative movement of said parts and said expander, to move said parts into positions to expand the perimeter of the work engaging portion of said punch during the punching stroke, a center pilot slidably arranged in the axial portion of said expander, and means for yieldingly urging said pilot into a position in which it extends beyond the work engaging end of said punch.

23. A punch having the work engaging portion thereof split through a substantial distance from the work engaging end thereof, said split portion being normally of a perimeter to form in the work a hole of the desired dimensions and being contractible by the work after punching the same to facilitate withdrawing the punch from the work, and means for limiting the extent to which the split portion of the punch expands radially outwardly while penetrating the work.

24. A punch formed of a plurality of parts divided from each other along a surface extending substantially lengthwise of the direction of movement of the punch toward and from the work, a spacing member arranged between said parts at one end of said punch, means for securing said parts in fixed relation to each other at said end of said punch for supporting said parts at the other end of said punch yieldingly in spaced relation to each other to permit said last mentioned parts to be flexed toward each other by the work after perforation of the same by the punch.

25. A punch formed of a plurality of parts divided from each other along a surface extending substantially lengthwise of the direction of movement of the punch toward and from the work, a spacing member arranged between said parts at one end of said punch, a collar fitting tightly about said parts at said part of said punch for holding said parts in fixed relation to each other at said end of said punch for supporting said parts at the other end of said punch yieldingly in spaced relation to each other to permit said last mentioned parts to be flexed toward each other by the work after perforation of the same by the punch, and means for holding said parts against lengthwise movement relatively to said collar.

26. A punch having the work engaging portion thereof provided with a plurality of parts at least one of which is movable to a limited extent relatively to another part in a direction at an angle to the length of said punch such that during the punching stroke, said movable part has a component of movement transversely of the direction of movement of the punch to increase the perimeter of said portion of the punch, said component of movement during the stripping movement of the punch decreasing the perimeter of said portion of the punch, said other part of the punch having the work engaging portion thereof split lengthwise to a substantial distance from the work engaging end thereof and having the parts of said split end spaced apart during the punching stroke and movable toward each other during the stripping stroke.

27. A punch having the lower work engaging portion thereof provided with a plurality of parts, at least one of which is movable to a limited extent relatively to another part, said parts being split from each other along a surface extending at an angle to the direction of movement of the punch toward and from the work, said first part being of less width at the upper portion thereof than at the bottom, when measured transversely of said surface, and normally extending below said other part, whereby said first part, upon engaging the work will be moved into a position to expand the perimeter of the work engaging part of the punch to that desired, and upon withdrawing the punch from the work, said first part will move into a position to reduce said perimeter, said other part of the punch having the work engaging portion thereof split lengthwise to a substantial distance from the work engaging end thereof and having the parts of said split end spaced apart during the punching stroke and movable toward each other after piercing the work, to further reduce said perimeter.

28. A punch including a work punching member split lengthwise into a plurality of work engaging parts, an expander member arranged in wedging engagement with said punching member, one of said members being movable relatively to the other member and being adapted to engage the work in advance of said other member, the relative movement of said members in a direction toward the work causing said parts to separate to expand the work engaging end of the punch, when entering the work and to move toward each other to contract the work engaging end of the punch after penetrating the work.

29. A punch including a work punching member split lengthwise into a plurality of longitudinally extending parts, said parts being normally in engagement with each other at their work engaging ends, an expander member arranged in wedging engagement with said parts of said punching member, one of said members being movable relatively to the other member and being adapted to engage the work in advance of said other member, the relative movement of said members in a direction toward the work causing said parts to separate to expand the work engaging end of the punch, when entering the work and to move toward each other to contract the work engaging end of the punch after penetrating the work.

30. A punch including a work punching member split lengthwise into a plurality of longitudinally extending parts having their work engaging ends movable toward and from each other, an expander member, one of said members being movable to a limited extent relatively to the other member by engagement with the work to be punched, and cooperating wedge means on said members arranged to cause said work engaging ends of said punch parts to separate slightly before penetrating the work and to move toward each other after penetrating the work.

31. A punch including a work punching member split lengthwise into a plurality of longitudinally extending parts having their work engaging ends movable toward and from each other, means for supporting said work punching member, said means providing for a limited lengthwise movement of said member thereon, an expander member having a wedge connection with said parts of said punching member and held in fixed relation to said supporting means, said punching member, upon engagement with the work, being moved relatively to said expander member to cause said wedge connection to separate said parts to increase the perimeter of work engaging end of said punching member, said punching member upon withdrawal from the work, being gripped by the work to move said parts in the reverse direction relatively to said expander member to contract said perimeter to facilitate the stripping of the punch from the work.

32. A punch including a work punching member split lengthwise into a plurality of longitudinally extending parts having their work engaging ends movable toward and from each other, an expander having a wedge connection with the work engaging ends of said parts and arranged to engage the work in advance of said parts during the punching stroke thereof, the angular relation of said wedge connection being such that said parts normally move said expander into a position in which the perimeter of the work engaging end of said parts is contracted and whereby engagement of said expander with the work moves said parts outwardly from each other to expand said perimeter, and means for limiting the movement of said expander relatively to said punching member.

GEORGE F. WALES.